(12) United States Patent
Bowater et al.

(10) Patent No.: US 6,272,146 B1
(45) Date of Patent: Aug. 7, 2001

(54) BUS CONNECTION SET UP AND TEAR DOWN

(75) Inventors: Ronald John Bowater, Romsey; Michael Cobbett, Eastleigh; Robert Michael Jordan, Winchester; Andrew James Ritchie, Eastleigh, all of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/965,365

(22) Filed: Nov. 6, 1997

(30) Foreign Application Priority Data

May 6, 1997 (GB) ................................................ 9709183

(51) Int. Cl.$^7$ .................................................. H04L 12/40
(52) U.S. Cl. .......................................... 370/438; 370/458
(58) Field of Search ..................................... 370/257, 260, 370/262, 362, 373, 371, 431, 437, 438, 458, 442, 439

(56) References Cited

U.S. PATENT DOCUMENTS

| | | | |
|---|---|---|---|
| 5,056,086 | * | 10/1991 | Libonati ................................ 370/351 |
| 5,184,347 | * | 2/1993 | Farwell et al. ......................... 370/350 |
| 5,276,678 | * | 1/1994 | Hendrickson et al. ............... 370/362 |
| 5,581,553 | * | 12/1996 | Cave et al. ............................ 370/362 |
| 6,088,361 | * | 7/2000 | Hughes et al. ........................ 370/439 |

FOREIGN PATENT DOCUMENTS

| | | | |
|---|---|---|---|
| 0550274 | 7/1993 | (EP) | ............................. H04Q/11/04 |
| 0550275 | 7/1993 | (EP) | ............................. H04Q/11/04 |

* cited by examiner

*Primary Examiner*—Chau Nguyen
*Assistant Examiner*—Chiho Andrew Lee
(74) *Attorney, Agent, or Firm*—Edward H. Duffield

(57) ABSTRACT

A bus connection controller in a voice processing is for managing the connection of a timeslot on a time-division multiplex (TDM) bus to a port on an adapter. The voice processing system includes basic time-division multiplex (TDM) connection management to enable the coordination of connections between resources such as channels on line cards (SPacks or VPacks), and channels on digital signal processor (DSPs) cards that provide, amongst others things, voice recognition, text-to-speech, fax capabilities and so on. Problems are encountered when a telephone call in a voice processing system ends suddenly because one of the callers hangs up. If the telephony channel has connections with other channels or resources via a TDM bus, callers may hear spurious data. To address this problem each call is associated with its corresponding connection on the TDM bus and each connection is associated with its connection details including the adapters and ports involved in connecting the calls. When one of the calls ends all the relevant ports involved with the connection are immediately disconnected.

21 Claims, 10 Drawing Sheets

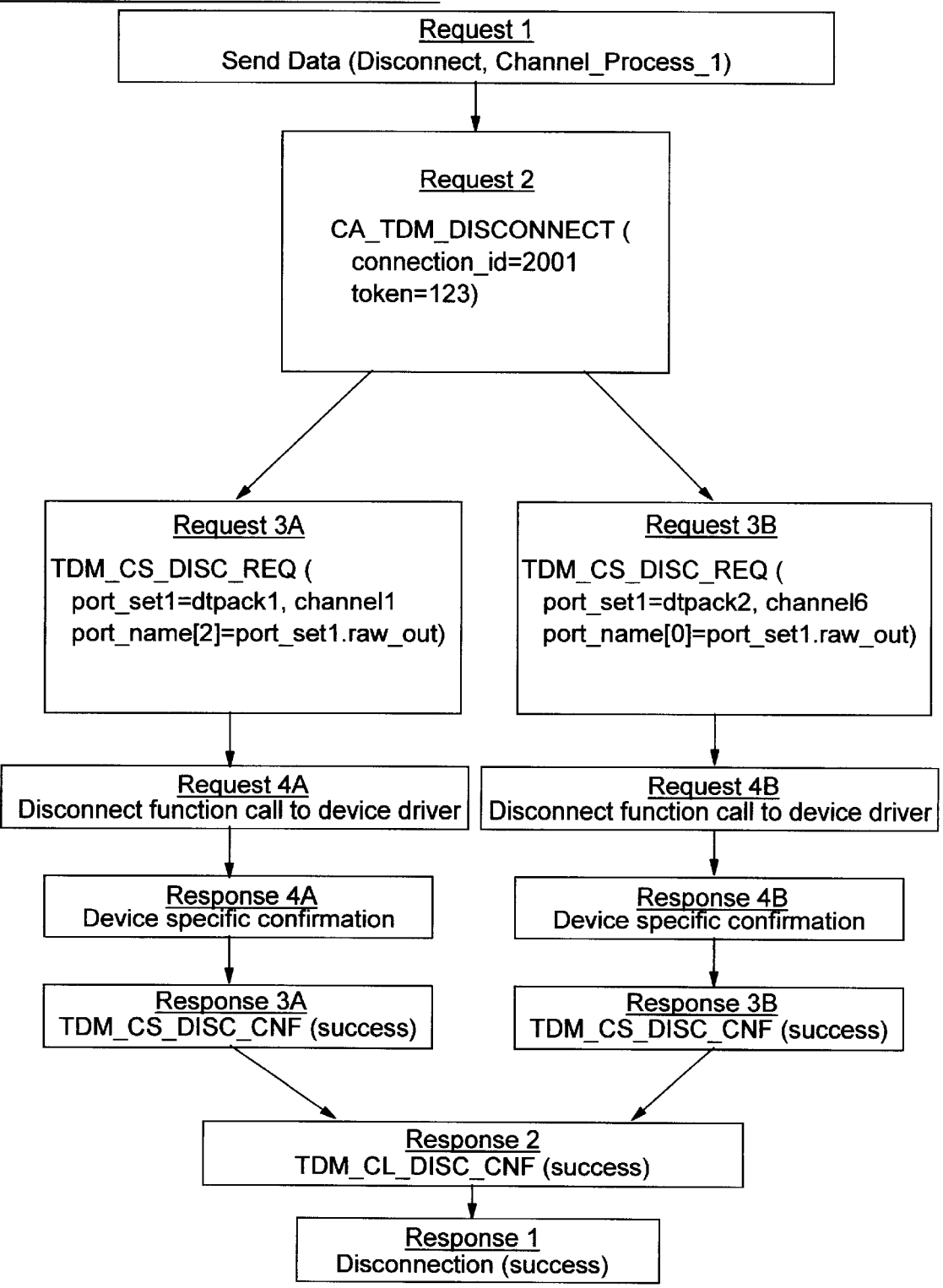

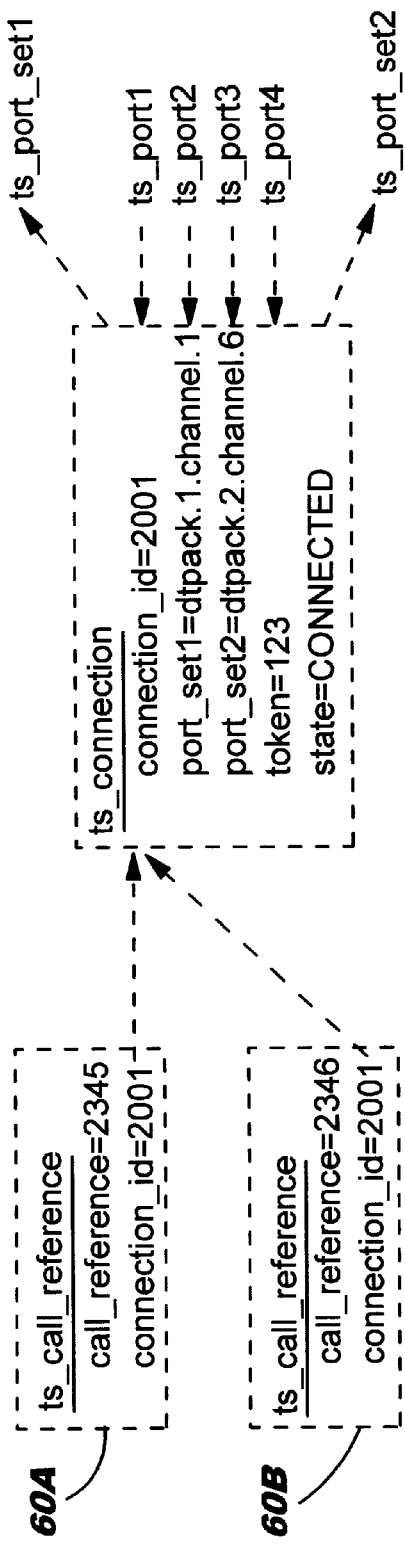
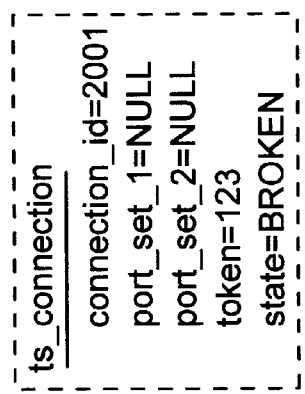
FIG. 7A
FIG. 7B

BUS CONNECTION SET UP AND TEAR DOWN

FIELD OF INVENTION

This invention related to a bus connection set up and tear down and particularly to a time-division multiplex (TDM) bus connection controller for allowing new adapters to be supported.

BACKGROUND OF INVENTION

Known voice processing systems includes basic time-division multiplex (TDM) connection management, to enable the coordination of connections between resources such as channels on line cards (SPacks or VPacks), and channels on digital signal processor (DSPs) cards that provide, amongst other things voice recognition, text-to-speech, fax capabilities and so on. Connections are made via a TDM bus, for example Dialogic's SCbus.

Problems are encountered when a telephone call with a voice processing platform ends suddenly because the caller hangs up. If the telephony channel has connections with other channels or resources via a TDM bus, callers may hear spurious data. When a caller hangs up, and the channel into which they were connected is involved in TDM connections, TDM connections should be cleared up by the custom servers which set them up, but this may not happen immediately due to unpredictable scheduling delays of user space processes. Two undesirable situations may arise. Firstly, if the channel was transmitting onto the TDM bus, e.g. the caller was tromboned to another caller, spurious voice data may be sent to the bridged caller. Initially this could be noise/idle pattern, but if the channel was quickly re-us before the application have acted on the hangup condition and eliminated the bridge, then the remaining bridged caller could hear someone else's voice. Secondly, if the channel was listening to the TDM bus, e.g. the caller was tromboned to another caller, or was connected to a text-to-speech device, voice data from the TDM bus may continue to be transmitted to the line, even though the call is no longer in progress.

These problems result in impaired usability by callers into the system, and also possible homologation problems which may prevent the attachment of the voice processing equipment to telephone networks in certain countries.

Further problems are encountered in setting up a new telephone connection. A common use of a TDM bus is to make connections between a caller who has called in to a voice processing system, and a called party, to whom a call has been placed by an application running on that voice processing system. Examples of such an application include a chargecard calling service, or transfer of a call from an IVR application to a call centre agent for human intervention.

In the example of the chargecard calling service; after entering the desired number, the calling party expects to hear ringing from the called party's telephone, or in case the call fails, an indicative tone (busy, invalid number, etc). However due to a limitation in current voice processing systems, it may be impossible to know which telephony channel will be used to make the outbound call, until the call has completed. This may be because the high-level voice application development environment provides an automatic MakeCall action, which only returns channel number to the caller after it has detected that the call has been answered, or has failed. Alternatively it could be due to a telephony signalling protocol which implements "channel negotiation" i.e., is able independently to select a different channel from that initially chosen, due to a clash between incoming and outgoing calls on the initially selected channel.

If the outgoing channel is not known until the call completes, the application designer has no option but to wait for call completion before requesting the TDM connection between the callers. Therefore the application does not meet the callers expectations as they will not be able to hear ringing from the called party's phone. Instead the application designer will probably need to play an announcement such "please wait while your call is connected", after which the next thing the caller will hear is the called party's voice saying "hello?". Even worse, if there are inherent delays in establishing the TDM connection, part of the called party's greeting may be lost, causing confusion between the callers.

The key idea of this invention is to allow TDM connections to be requested 'before' a MakeCall action, even though the channel number for the outgoing call has not yet been chosen. The voice processing system will defer requests for unknown channels, but will automatically complete them as soon as the calling channel is known, without intervention from the application.

The proposed solution is for the line adapter driver to provide a notification to the system timeslot manager. Each time a far-end (i.e. caller) hangup is detected, and each time a new outbound call is placed. Each notification contains the call reference for the affected call, and in the case of a new call notification, identification of the channel on which the call has been placed.

System timeslot manager uses the information in these notifications to identify TDM connections which should be made or broken.

BRIEF DESCRIPTION OF DRAWINGS

In order to promote a fuller understanding of this and other aspects of the present invention, an embodiment will now be described, by way of example only, with reference to the accompanying drawings in which:

FIG. 6 is a flowchart showing the process steps involved in a disconnection.

FIG. 7A is a schematic representation of software objects used in automatic teardown of a connection;

FIG. 7B is a schematic representation of a connection software object after automatic teardown of a connection;

DETAILED DESCRIPTION OF PREFERRED EMBODIMENT

1.0 Hardware

Figure 1:
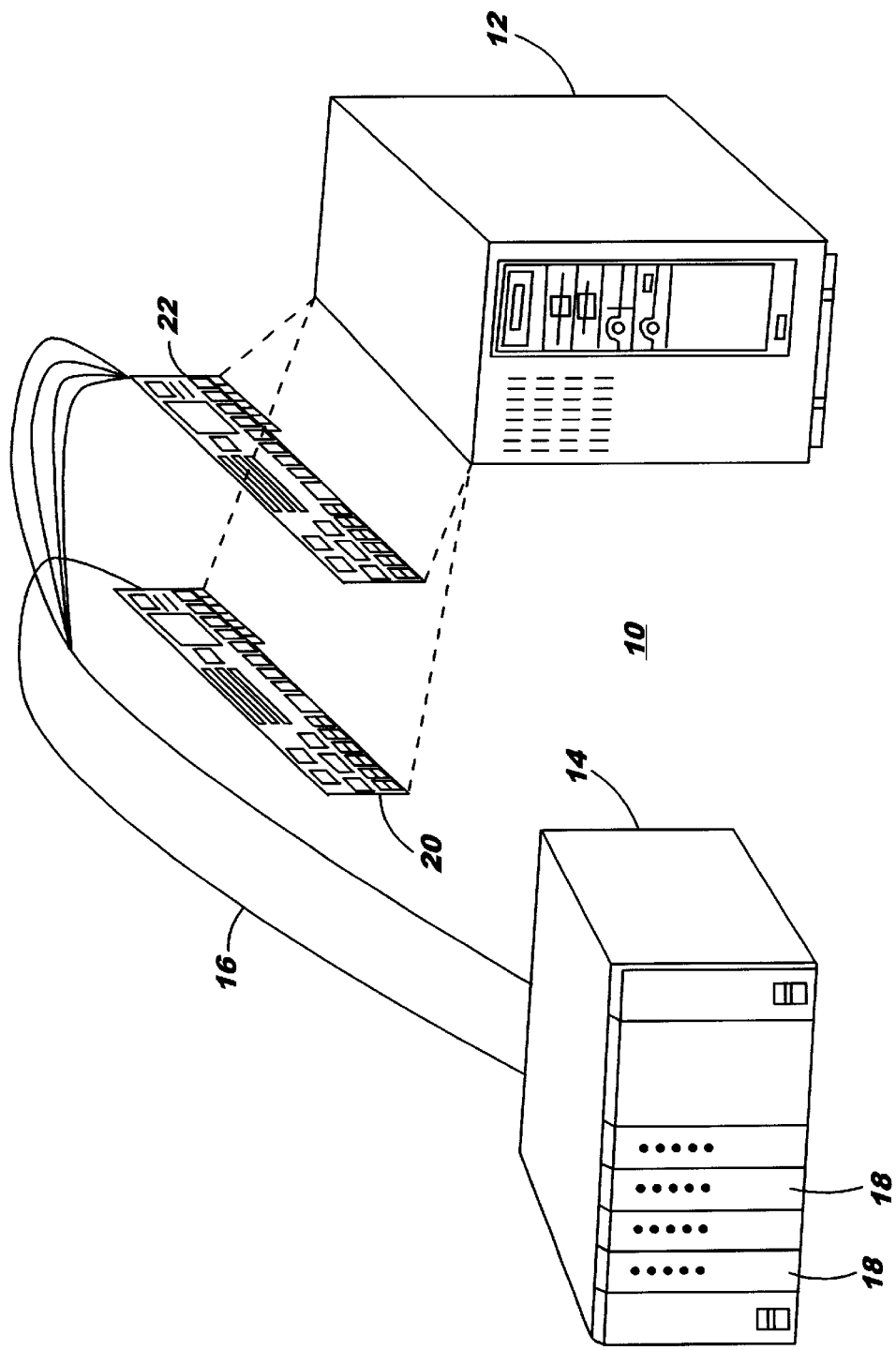
FIG. 1 is a schematic of a voice processing system.

A typical voice processing system 10 may comprise two units: a computer server 12 such as IBM's RS/60000 System and a multiple digital trunk processor (MDTP) 14 such as IBM's 9295 (see FIG. 1).

The computer server 12 has most features of any typical computer server 12 including a microprocessor (for example an IBM RISC microprocessor), memory, disk storage, CD-ROM drive, color display, keyboard and mouse. The computer server 12 should run an operating system such as IBM AIX v4.2 for RS/6000 and voice processing software such as IBM Direct Talk for AIX.

Figure 2:
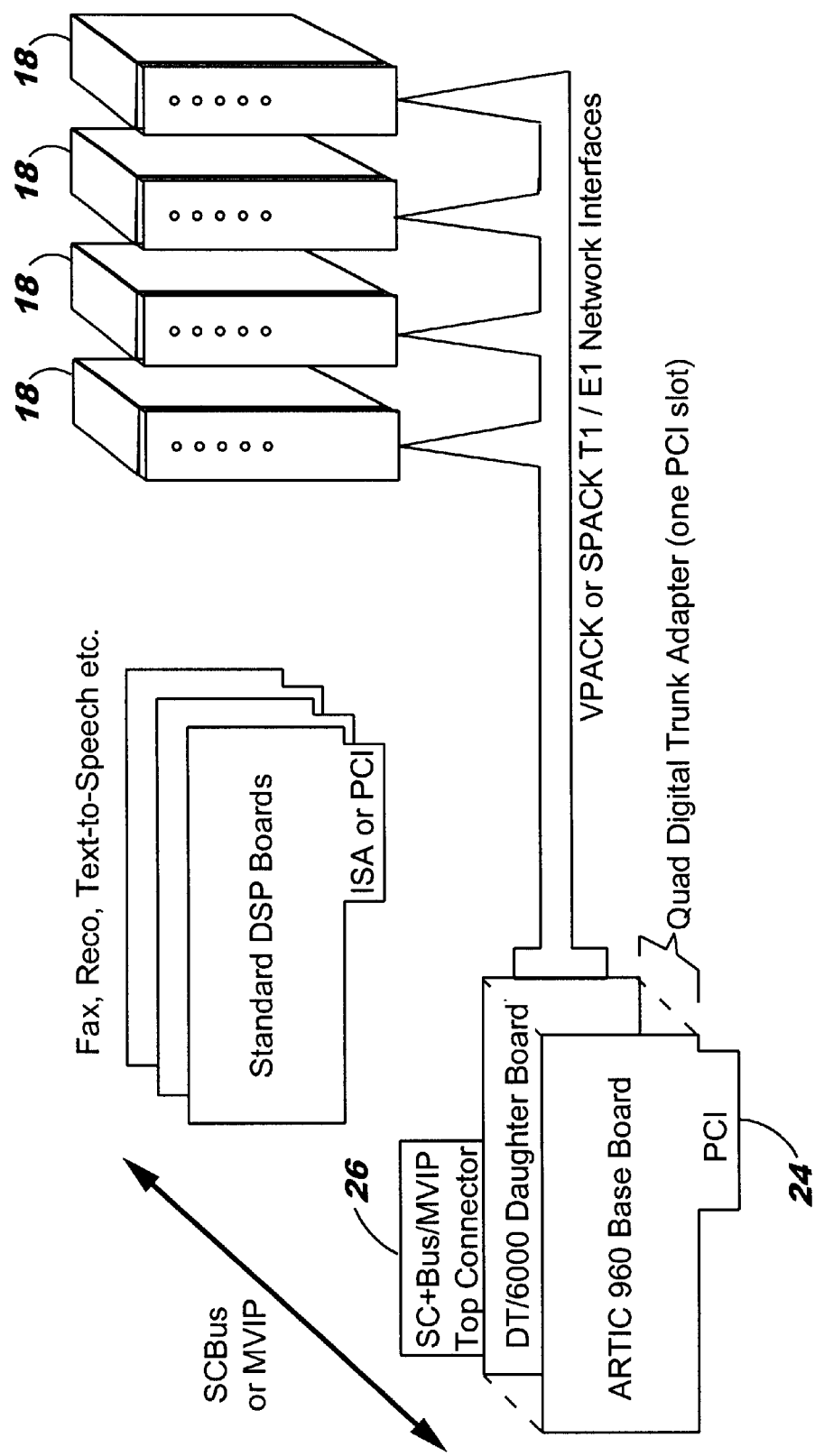
FIG. 2 is a schematic of the hardware components within the voice processing system including the data buses and voice channels.

The MDTP 14 is a combination of digital signal processor cards and supporting equipment that provides high quality voice compression and digital telephone signalling functions (transmit and receive) via an external shielded cable to the attached computer server 12. The MDTP 14 houses Packs 18 (VPacks and SPacks) consisting of a base card connected to a digital trunk adapter (DTA) in the computer server, and a trunk interface card which manages the trunk connection to a telephony network switch. The MDTP 14 contains slots for up to five VPacks 18 (see FIG. 2). The SPack 18 is required to implement common channel signalling protocols, for example SS7.

A digital trunk adapter (DTA) 20, a digital trunk dual adapter (DTDA) and a digital trunk quad adapters (DTQA) 22 are three different adapters which may connect to a bus 24 on an RS/6000 computer server 12 to complete the connection to a MDTP 14. A DTA 20 connects a single Pack 18 and a DTDA connects two Packs 18, both adapters plug into Micro Channel slots on the computer server. A DTQA 22 connects four Packs 18 and plugs into a PCI slot on the computer server.

PCI and ISA buses 24 on the RS/6000 also holds several other standard digital signal processor cards for functions including fax, voice recognition and text-to-speech applications. Data may be passed on the PCI bus 24 but a faster solution is to pass all voice data over a bus dedicated to voice data.

This dedicated bus is a time-division multiplex bus (TDM bus) 26 which can transmit data over many data channels but relatively few physical connections by multiplexing the data into time slots 28 at the transmitting end and demultiplexing at the receiving end. One channel can be considered to be a half-duplex unidirectional path of 64 kbps. A time slot 28 is the smallest switchable data unit on a data bus, consisting of eight consecutive bits of data and equivalent to a data path with a bandwidth of 64 kbps.

Each of the adapters receives and transmits data onto the TDM bus 26 via a sink port 30A and a source port 30B respectively. A port is one end of a 64 kbps unidirectional data path which can be attached to the TDM bus 26. Ports can be seen as sources which place voice onto the TDM bus 26, or sinks which take voice data from the TDM bus 26. Examples of ports are: the voice data received from a caller via a telephony channel and placed on the TDM bus 26 by the DTQA 22 (source port 30B); the data which may be generated by a text-to-speech adapter (source port 30B); and the data taken from the TDM bus 26 by a voice recognition adapter to detect what a caller is saying (sink port 30A).

Often, an application needs to connect multiple data streams. For example, the voice processing software will need to connect a caller A's transmit data path to a caller B's receive data path and vice versa. For this reason the concept of a port set 32 is introduced. This defines a set of one or more ports which may need to be connected to a complementary port set as a single operation. One example of a port set 32 containing more than one port is the transmit/receive pair of a telephony channel on a DTQA 22. The resource maybe a VPack 18 unit called 'dtPack1' and the channel used on the Pack 18 maybe 'channel 1' in which case the port set 32 can be 'dtPack1.channel1'. The individual ports may be labelled raw_in and raw_out and the ports will be identified as 'dtPack1.channel1.raw_in1' and 'dtPack1.channel1.raw_out'. Voice recognition with barge-in and the ability to play beeps as a prompt to the caller is another example. Such a voice recognition port set requires three ports: a sink port to accept the caller's voice; another sink port to accept a copy of the prompt being played to the telephony channel, which is needed to perform echo cancellation; and a source port to play beeps to prompt the caller that a voice recognition application is activated. The port set for this example may be 'dtPack1.echo_cancel_and_beep1' and include both previously mentioned source ports 30B and an additional sink port 30A 'dtPack1.channel1.raw_in2'.

The voice processing system 10 supports the definition and naming of port sets 32 and certain software calls accept port set names as parameters. A port can be a member of several port sets 32 as it may need to be used in different combinations by different applications. Port sets 32 to be connected must be compatible, that is compatible port sets must contain a complementary number of sources and sinks. Notwithstanding the aforementioned, a port set 32 may consist of a single port.

A resource such as an adapter, E1/T1 interface or a DSP has a corresponding resource group. Each resource group contains a number of port sets 32. In a running system, there may be multiple instances of each defined resource group. Multiple instances of the resource group will be created, depending on how many adapters, E1/T1 interfaces or DSPs are installed. For example, a fax adapter may support 12 fax channels. This would be defined as one resource group containing 12 port sets 32. If two fax adapters are installed, there would be two resource groups, each with 12 port sets 32. The main benefit of the resource group concept is that a resource group is only defined once when a new resource group type is configured, and the actual number of resource groups in the system can be discovered dynamically at system startup. No configuration changes are needed just to add a new instance of an existing resource group.

2.0 Voice Processing Software

The voice processing software includes components to control and manage the TDM connection so that connections between resources may be coordinated to provide the voice recognition, text-to-speech, fax capabilities, and so.

The components of the voice processing software comprise the channel processors 40 for communicating with one or more custom servers, a custom server 42 for communicating with a system timeslot manager 44. The system timeslot manager 44 is for communicating with a number of connection servers 46, one for each type of adapter connected to the TDM bus 26 and each connection server 46 for communicating with a respective device driver type 48 which communicates through a hardware interface to the adapter (see FIG. 3).

When a call in bound over the telephony trunk lines connects with the voice processing system 10 a channel process is activated so that for each active call there is one active channel process. A channel process is an operating system (AIX) process that executes a state table program to deal with the call. The voice processing software can run over a hundred channel processes simultaneously to deal with a corresponding number of calls. A state table program is a list of actions performed by the channel processor 40 in a particular voice processing application. State table programs provide the basic logic of the interaction with callers, calling prompts and voice segments to provide voice output from the application. A state table program can instruct a channel processor 40 to send a request to a custom server 42 to provide functions that are not possible on the channel processor 40. A voice application is a collection of state table programs, prompts and voice segments which together provide the desired functionality of the voice processing software.

2.1 Custom Server

The custom server 42 is a C/C++ language program that provides data manipulation and local or remote data handling, database, or other services beyond those provided by the state table program running on the channel processor 40. A custom server 42 provides an interface between the voice processing software and other business applications, functions, or other processes to give callers access to business information and voice processing functions such as voice recognition. A requests for a port set 32 to be connected to or disconnected from the TDM bus 26 come from a custom server 42 processing custom server library functions. Two custom server library functions exist: CA_TDM_Connect and CA_TDM_Disconnect. Each custom server 42 sends these functions over a TCP socket connection to the system timeslot manager 44. Responses are returned via the same connection. On receiving a response the custom server 42 analyzes the response and returns to the caller an appropriate return code. If no response is received within a certain time-out period (specified by configuration file, or by system parameters) the operation is assumed to have failed and the library function will return with a return code indicating the error.

The state of a port set 32 is not maintained within the custom server library functions—this is the responsibility of the system timeslot manager 44. The custom server library functions are simply responsible for converting function requests into protocol primitives which form the responses.

2.2 System Timeslot Manager

The system timeslot manager 44 maintains a map of all ports in the system, the state of each port, the state of connections between ports. It receives requests from clients, normally DirectTalk custom server 42s, and processes them. Processing involves the following steps (i to vi):

i. Analyze request to determine resource availability and state.
ii. If resources are available, mark as in use, if not, return failure to caller.
iii. Break down request into individual port connection requests, and group these according to which adapter type the connection involves.
iv. Send separate requests (Request 3A and 3B in FIG. 3) via TCP connection to connection servers 46 responsible for each adapter type.
v. Await responses from connection servers 46 (Response 4A and 4B).
vi. If all connections succeed, return success response (Response 2) to client, else undo any partial connections, and return failure to client.

The system timeslot manager 44 does not contain any code which is specific for a particular type of adapter and effectively deals in abstract ports. Interactions with specific adapter types are isolated within the connection servers 46.

Figure 4:
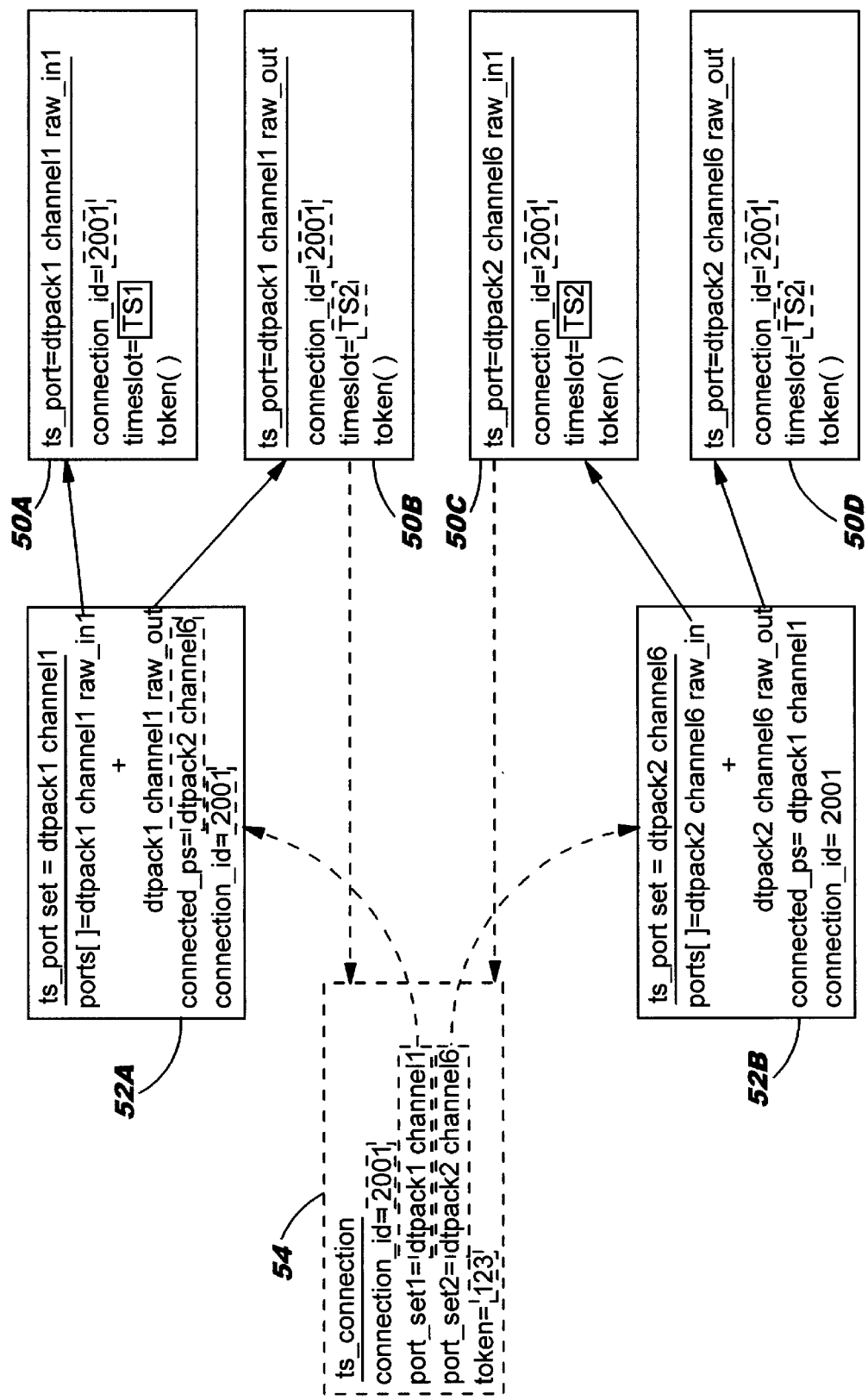
FIG. 4 is a schematic representation of software objects used in a connection.

Ports, port sets 32 and connections in the system are stored by the system timeslot manager 44 as a software objects called t_s port 50A,B,C,D, ts_port_set 52 and ts_connection 54 respectively (see FIG. 4). Ts_connection 54 is dynamic (shown in FIG. 4 by a broken line) and is only created by the system timeslot manager 44 when a new connection is made, when a connection is disconnected the ts_connection object 54 is destroyed. Ts_connection 54 has characteristics including a connection_id 58 (a number representing the nth connection eg 2001), pointers to the connected ts_port_set objects 52A,B (eg dtpack1.channel1) and a token 56 which is passed to the system timeslot manager 44 by the custom server 42. Ts_port_set 52A,B is permanent (shown by the solid line in FIG. 4) and includes permanent characteristics such as its name (eg ts_port_set=dtPack1.channel1), pointers to ts_port objects 50A,B,C,D which are included in the port set 32, and dynamic properties such as a pointer to the other port set 32 which is connected (eg. connected_port_set= dtPack2.channel6) and a pointer to the ts_connection object 54 (eg connection_id=2001). The dynamic properties are set by the system timeslot manager 44. Ts_port objects 50A,B,C,D are also permanent and includes permanent characteristics such as its name (eg. ts_port= dtPack1.channel1.raw_in1), and dynamic properties including its connection status (eg broken or a connected), a time slot 28 on the TDM bus 26 to which it is connected (eg time_slot=TS1) and the token 56 of the custom server 42 which set up the connection. The ts_port object 50 may have a method of fetching the token 56 from the ts_connection object 54 instead of storing the property itself.

Objects used by the Custom server 42 are the ts_call_ reference objects, each of which stores a connection_id of a connection used by a particular call.

2.3 Connection Server

A connection server 46 exists for each type of adapter in the system. It isolates the system timeslot manager 44 from the details of APIS controlling TDM bus connections for different adapter types.

Connection servers 46 receive requests (Requests 3A and 3B in FIG. 3) via TCP connection from the system timeslot manager 44, and make device-specific API requests (Requests 4A and 4B) to connect or disconnect ports to/from specified TDM bus timeslots. They then return responses (4A and 4B in FIG. 3) to the system timeslot manager 44 via the same TCP connection.

The voice processing software of the embodiment provides connection servers 46 for supported adapters and third parties may add support for additional adapters by implementing new connection servers 46. The protocol primitives passed via the TCP connection can be used by partners who plan to implement new connection servers 46.

2.4 Custom server functions

The interface to users of the system timeslot manager 44 (such as DVT Client, Matrix Switching or One-call Fax) is via a pair of new custom server function calls: 'CA_TDM_ Connect' and 'CA_TDM_Disconnect', 'connection_id_ p' is a pointer to an unsigned int into which the connection_ id 58 will be written.

'CA_TDM_Connect's purpose is to make a connection between two port sets via the TDM bus 26. An example of its syntax is: 'int CA_TDM_Connect (const TDM_ CONNECT_ST *connect_parm_sp, unsigned int *connection_id_p);' 'connect_parm_sp' is a pointer to a TDM_CONNECT_ST input structure.

This request (Request 2) is sent from the custom server 42 to the system timeslot manager 44 in response to a 'send data' request (Request 1) made by the channel processor 40. The routine establishes a connection between the two port sets 32 named in the TDM_CONNECT_ST parameter and pointed to by the connect_parm_sp parameter. The port sets 32 named in the TDM_CONNECT_ST parameter must have corresponding source ports 30B and sink ports 30A. Port connections will be made according to the order that source ports 30B and sink ports 30A are specified in the configuration files. When complementary port sets are connected and when there is more than one port the port set, the port connections will be made according to the order that ports are specified in the configuration file. If the connection is established successfully, a connection_id 58 will be returned to the calling routine. This connection_id 58 is needed to identify the connection when CA_TDM_Disconnect( ) is subsequently called to break the TDM connection. The calling routine chooses a token 56 associated with the connection to provide a simple security mechanism for preventing unauthorised processes from breaking connections. The same token 56 must be presented on calling a subsequent routine to either break the connection, or to override it by making a new connection (a new connection implicity breaks all existing connections involving the same sink ports. Each custom server 42 using TDM subroutines chooses a single token and uses the same token on all calls to the TDM subroutines. Multi-process custom servers should share the same token throughout all processes. An unsigned integer as a token 56 uses the least memory but other ideas are the author's date of birth, or a value hashed from the custom server name. This does not guarantee unique tokens, nor that a malicious custom server writer could not guess values, but it avoids most inadvertent problems. Two link_id parameters are also supplied by the calling routine. If a port set 32 to be connected is a DTQA telephony channel, the corresponding link_id parameter should be set to the ID of the channel process which is running an application on that channel. If a port set 32 is a resource card such as voice recognition, text-to-speech or fax, the corresponding link_id parameter should be set to (−1). The purpose of this parameter is to associate TDM connections with calls-in-progress. The call identified by a link_id parameter is considered to own the TDM connection. The connection will be automatically broken when this call ends. When the connection is between two telephony channels, as in the case of matrix switching, two link_id parameters are needed, relating to the calls in progress on each of the telephony channels. The connection is automatically broken when either one of these calls ends.

The token 56 may be stored with sink ports 30B because any port can be a member of several different port sets 32 and protection is needed against inadvertent or malicious breaking of connections between ports and the TDM bus 26. This can arise from making new connections with a different port set 32 which happens to include some of the same ports as an existing connection. Source ports 30B are normally hardwired to the TDM bus 26 at startup time, that is the TDM bus slot is permanently set while the sink ports 30A have dynamic timeslots. The main thing to protect is that sink ports 30A cannot be removed from the bus except by the process which attached them, or an authorised proxy. For this reason, the token 56 is stored with each sink port, and existing sink port connections will not be broken unless the correct token 56 is presented.

When a connection is implicitly broken, a ts_connection object 54 still exists within TDM connection management, and the connection_id 58 is still valid for subsequent CA_TDM_Disconnect( ) calls, but the connection will go into a state of BROKEN, indicating that there is no longer any TDM connection. This is the same behaviour as when a call ends, and connections are broken implicitly by a cleanup of connections owned by that call reference.

Within the custom server, call references are used to ensure that TDM connections are made on the intended channel and within the duration of the intended call. A CA_Receive_DT_Message( ) function maintains a mapping between link_id and the most recent call reference received from the corresponding channel processor 40. The link_id parameter(s) supplied by the caller of the CA_TDM_Connect( ) subroutine are converted within the subroutine into call references, and these are later used by the DTQA device driver 48 to ensure that the connection request is for a valid call-in-progress. Since a call reference is required, TDM connections may not be made with telephony channels which do not have a call in progress.

If the connection is successful then the response (2) from the STM is a return code of 0. If the connection is unsuccessful the response (2) is a return code of −1 and a global error number is set to indicate the error. Examples of the connection errors are as follows: port sets 32 are not complementary and could not be connected; one or both port sets 32 are already involved in an established connection which was not broken, as the token 56 supplied did not allow it; the port set name(s) specified are not valid; one of the parameters is an invalid pointer; the port sets 32 specified are already connected to one another; TDM connection management processes are not running or reported an error; the call owning this connection has ended; the custom server 42 is terminating.

'CA_TDM_Disconnect's purpose is to break an existing connection between two port sets 32 via the TDM bus. An example of its syntax is: 'int CA_TDM_Disconnect (const TDM_DISCONNECT_ST *disconnect_parm_sp);' the request (Request 2) is sent from the custom server 42 to the system timeslot manager 44. The routine breaks a connection on the TDM bus between two port sets 32. The connection is identified by a connection_id 58 which was returned from CA_TDM_Connect( ) at the time connection was established. The connection is only broken if a token 56 supplied in the request matches the one which was specified when the connection was established. If the disconnection is successful then a return code of 0 is sent in the response (Response 2). If the disconnection is unsuccessful then a return code of −1 is sent in response (2) and a global error number is set to indicate the error. Examples of the disconnection errors are as follows: one of the parameters is an invalid pointer; the supplied token 56 did not match the one used when the connection was made; the connection_id parameter is not valid, or is not recognised as a current connection; TDM connection management processes are not running or reported an error; the call owning this connection has ended; the custom server 42 is terminating.

2.5 Configuration

One configuration file is required for each resource type adapter controlled by system timeslot manager 44. This makes it easy for third parties to add support for a new resource type by simply adding a new configuration file to one of the directories on the configuration path. The configuration files provided with the voice processing software should not need to be altered, even when new resource types are added, or additional instances of the existing resource types are installed.

Configuration files for the resources supported by the voice processing software are shipped in a configuration directory. Third parties should normally add their configuration files to the directory, but any directory in the search path should be supported. Resource group configuration files should have a specific extension e.g. dtPack.rg.

Configuration files consist mainly of keyword=value pairs. Comments are preceded by a # character. Blank lines are ignored. Figures in parentheses indicate quantities. This example defines the resource group provided by an SPack 18 or VPack 18 attached to a DTQA 22.

```
resource_group_name=dtPack
connection_server_exec_cmd=$ {VAEBIN}/TSCS_DTQA
# individual ports
    source=raw_in1      (30) # from caller onto TDM bus
    source=raw_in2      (30) # prompt played by state
table copied onto TDM bus 26
    sink=raw_out   (30) # to play from TDM bus 26 to
caller
    # combinations of ports making up port sets
    port_set=channel (30) raw_in1 raw_out # for fax,
matrix switching, etc
                                    # for reco w/barge-in
    port_set-echo_cancel_and_beep (30) raw_in1 raw_in2
raw_out
```

A resource group corresponds to a physical entity such as an adapter, E1/T1 interface, or DSP. The application programmer defines: the port sets 32 which are contained within this resource group; and the name of the connection server 46 responsible for making connections related to these port sets 32. Only the contents of one resource group need be defined even if there are multiple instances of that resource group. The system timeslot manager 44 will replicate the resource group within its data structures at run time depending on the quantity of this resource group which is installed. For example, if the system contains 2 fax adapters and each adapter has 12 available fax channels, you only need to define the one fax resource group containing 12 fax channel port sets. System timeslot management will duplicate the resource group in its run-time data structures. The connection server 46 for this resource group will determine how many instances are installed.

A utility can be provided, which will search for and read any configuration files in directories in the search path, and check them for syntax and consistency errors. This can save time by avoiding having to startup in order to verify validity of configuration files.

The following information may be defined within the configuration file:

'resource_group_name'—a descriptive name which is used by custom servers as part of the identifier for port sets 32.

'connection_server_exec_cmd'—the text string which will be used by the timeslot manager to start the connection server process. This will be passed as an argument to one of the exec( ) family of functions.

'source'—a descriptive name for an individual source port 30B which is part of this resource group.

'sink'—a descriptive name for an individual sink port 30A which is part of this resource group.

'port_set'—a name of a port set 32, its quantity and the names of the source ports 30B and sink ports 30A comprising this port set 32.

'dvt_technology_name'—only applicable to a TDM technology which implements the distributed voice technology (DVT) architecture. This identifies the DVT technology name of the implementation.

'dvt_complementary_port_set'—only applicable to DVT implementations. Identifies the name of the port set 32 within the dtPack resource group, to which the channel port set 32 defined within this resource group will be connected.

3.0 Protocols

Components such as the custom server 42 and the system timeslot manager 44 communicate by passing primitives, normally via a TCP socket connection. This section defines the formats of primitives which will flow between components.

The data in primitives is encoded in ASCII format. The benefits of this approach are: the format is understood by all processor architectures and operating systems used in the computer telephony industry; and problem determination should be made easier as standard TCP/IP tracing tools can be used and the flows will be easily understood without complex decoding.

The drawback of this approach is that primitives may be bigger than they would be if a binary encoding was used, and processes will incur some penalty for converting numeric values to ASCII format. These factors will have a small adverse impact on performance. It is felt that these drawbacks are an acceptable price to pay for the benefits already outlined. Encoding/decoding routines are used to isolate the main body of code from the details of primitive formats, so that it may be possible at some later date to move to a binary format if performance problems are encountered.

Each primitive consists of a four-digit ASCII decimal numeric code, identifying the primitive type, a series of parameters, which will differ for each primitive type, and a terminating new-line character. Parameters are delimited by white space. All numeric values are passed as ASCII encoded decimal. For example: 9999 string_parm1 1234 string_parm2 string_parm3 \n.

The format of four digit primitive codes is XYYZ, where the digits have the following meanings:

Interface Type:
    0—Client Process To system timeslot manager 44;
    1—system timeslot manager 44 to Connection 46
    2—system timeslot manager 44 to Other system timeslot managers YY Specific primitive type:
    00—Register;
    01—Connect;
    02—Disconnect;
    03—Query Port Set;
    04—Query Connections;
    05—Reset Connections;
    06—Error;
    07—Status;

Generic Primitive type:
    0—Request
    01—Confirm;
    02—Indication;
    03—Response The following sections describe the functions of each primitive type.

3.1 Custom Server to System Timeslot Manager

TDM_CL_REG REQ(0000)—client registration request. When a client process wants to communicate with the system timeslot manager 44, it first opens a new TCP socket connection with the well-known protocol port of the system timeslot manager 44, then immediately sends this primitive on the new connection, to identify itself. A client can optionally request status updates, each time a connection is made or broken. This option is only intended for use by system management applications, and may have significant impact on resource utilization. The system timeslot manager 44 responds with TDM_CL_REQ_CNF.

3.2 System Timeslot to Connection Servers

TDM_CS_REG_IND(1002)—connection servers 46 listed in the configuration file are invoked by the system timeslot manager 44 at startup, using the exec command specified in configuration. On startup, each connection server 46 establishes a TCP socket connection with the system timeslot manager 44, at the well-known protocol port address. Connection servers 46 then send this primitive on the newly-established connection.

The main purposes of this primitive are as follows: to inform the system timeslot manager 44 that the connection server 46 has started up and is ready to receive requests; to inform the system timeslot manager 44 how many of each type of resource group are managed by this connection server 46 (the configuration file only specifies the number of port sets 32 present in one resource group, but the connection server 46 is responsible for discovering how many resource groups are installed in the system).

TDM_CS_CONN_REQ(1010)—request to establish a connection between a specified port set 32, and TDM timeslots. Since transmit timeslots are permanently allocated at startup, the operation to connect a port set 32 to the bus consists only of attaching the sink ports 30A to the appropriate TDM timeslots on which the complementary port set is transmitting. This primitive includes the following parameter. Where sink(n).port is the port eg raw_out[n] and sinks[n].timeslot is the timeslot on the TDM bus 26 e.g. 0–1023.

TDM_CS_DISC_REQ(1020)—request to disconnect a port set 32 from the TDM bus 26. Since transmit timeslots are permanently allocated at startup, the operation to disconnect a port set 32 from the bus consists only of detaching the sink ports 30A from TDM bus timeslots.

TDM_CS_QPORT_REQ(103)—request for status of port sets. System timeslot manager 44 needs to discover the transmit timeslot assignment of each source port 30B at startup. The connection server 46 is responsible for discovering this. Although the connection server 46 is essentially stateless, it must provide a facility to query transmit timeslot assignment via the adapter-specific API. The timeslot manager will query one combination of resource group name and port set name, e.g. resource group name: "Pack" and port set name "channel". The connection server 46 should respond with the timeslot assignments of each port set 32 instance of each resource group instance. Source ports 30B should be reported as the timeslot assigned at startup. Sink ports 30A should be reported as (~0), i.e. 0xffffff.

TDM_CS_QPORT_CNF(1031)—timeslot assignments of a resource group/port set type combination. After a short header, the bulk of this primitive will consist of timeslot assignments. The order in which timeslots are returned should be made clear by the following pseudo-code:

```
send primitive_type, request_correlator,
return_code;
    send resource group name and quantity of this
resource group (nrg) ;
    send port set name and number of instances per
resource group (nps) ;
```

-continued

```
send number of ports in this port set (np) ;
for (rg = 1 .. nrg)
{
  for (ps = 1 .. nps)
  {
    for (p = 1.. np)
    {
      send timeslot of ResourceGrp.rgPortSet.ps,
  port p;
    }
  }
}
```

TDM_CS_ERROR_IND(1062)—connection servers 46 do not have access to the voice processing system error log, so they must request the system timeslot manager 44 to log errors on their behalf. One connection server 46 defined text string will be added to the error log entry.

TDM_CS_ERROR_RSP(1063)—confirms that the system timeslot manager 44 has received the TDM_CS_ERROR_IND primitive, that its contents are valid, and the timeslot manager has logged the error.

4.0 Connection Process

Figure 3:
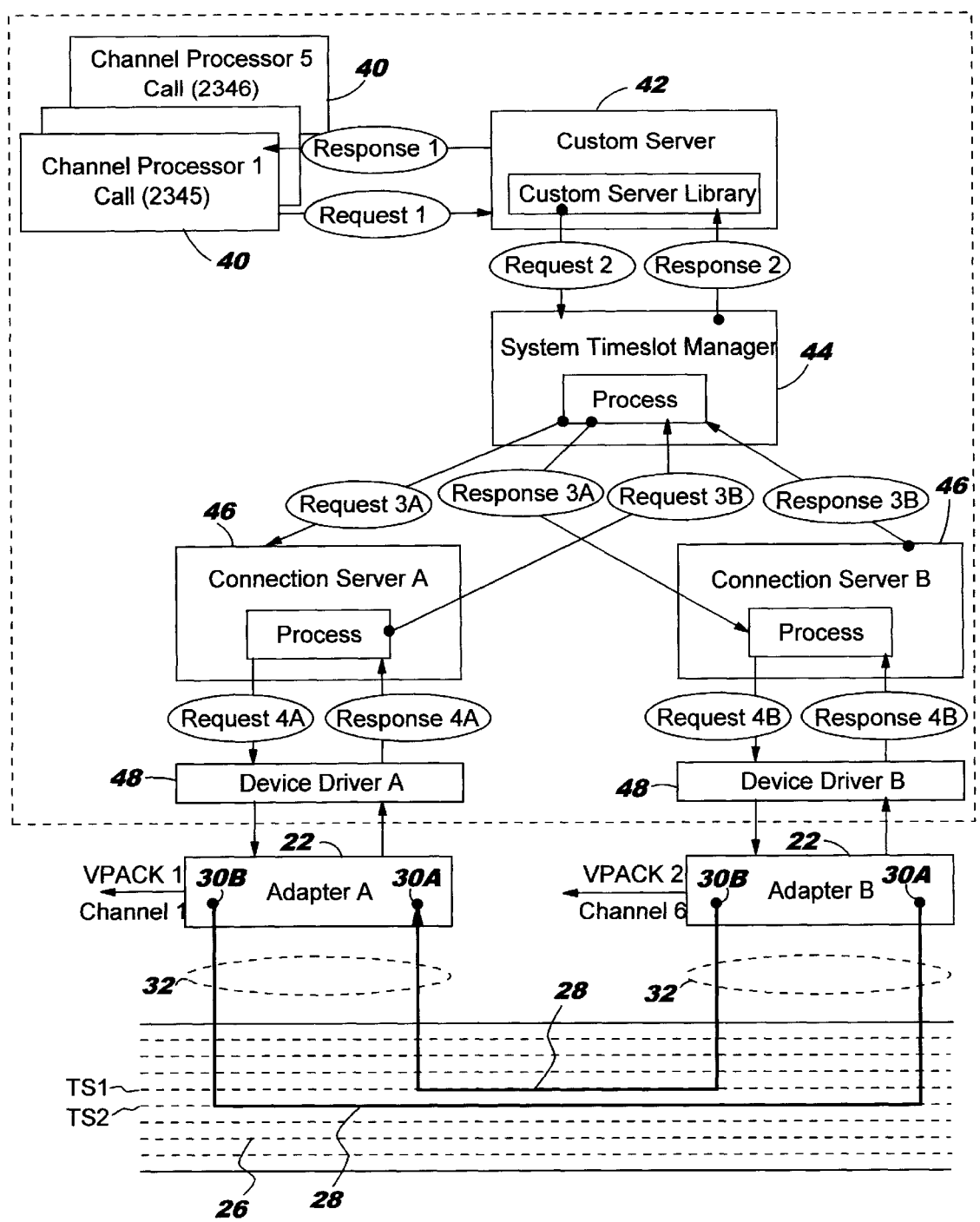
FIG. 3 is a schematic of the main components concerned with the TDM bus.

The steps involved in making a TDM connection will now be described using an example and with reference to FIGS. 3 and 4.

Channel processor 1 is handling a call (call reference=2345) which came in through VPack no.1 on channel 1 and wishes to connect the call (2345) to another call (call reference=2346). Call (2346) came in through VPack=2 on Channel=6 and is being handled by Channel Processor 5. Channel Processor 1 sends a request (Request 1) to the Custom server 42 in the form of 'senddata (connect, channelprocessor1, channelprocessor5)'.

The custom server 42 receives Request 1 and processes it to construct a CA_TDM_CONNECT request to send to the system timeslot manager 44. The call_references corresponding to the channel processors 40 are fetched e.g. call_reference1=2345 and call_reference2=2346. The port_sets corresponding to the channel processors are fetched e.g. port_set_1=dtPack1.channel1 and port_set_2=dtPack2.channel6. Finally a token 56 is fetched e.g. token=123 and the parameters are sent in Request 2 to the system timeslot manager 44. Request 2 takes a form similar to: CA_TDM_CONNECT(port_set_1=dtPack1.channel1, port_set_2=dtPack2.channel6, call_reference1=2345, call_reference2=2346, token=123).

The system timeslot manager 44 receives Request 2 and processes it to construct two TDM_CS_CONN_REQs (REQUEST 3A & 3B) to send to the connection server 46 that handles the two VPacks 18. In this case, since the adapter is of the same type then the same connection server deals with both requests but it should be clear that another connection server may be used for a different type of adapter. Two connection servers are shown in FIG. 3 despite the fact that only one is used in the present example. First, the system timeslot manager determines the individual ports from the port_set objects (ts_port_set 52A,B in FIG. 4) and checks each ports availability and state by accessing a method on each of the relevant port objects. If the none of the ports have connections then the port objects are marked for use else an error is returned to the caller. All the source ports 30B have permanent timeslots on the TDM bus 26 allocated to them already (indicated by the solid line in FIG. 4) and the system timeslot manager 44 matches this timeslot to the sink port 30A that is to be connected to the TDM. For example dtPack1.channel1.raw_in1 is permanently connected to TS1, therefore the system timeslot manager 44 requests that dtPack2.channel6.raw_out is connected to TS1 on the TDM bus 26. The system timeslot manager 44 sends separate requests (Requests 3A and 3B) via TCP connection to the connection servers 46 responsible for the appropriate adapters and awaits a response. Request 3A takes the form, similar to TDM_CS_CONN_REQ (port set_1=dtPack1.channel1, call_reference_1=2345, sink[0]port=dtPack1.channel1.raw_out, sink[0]timeslot=TS2). Request 3B takes a corresponding form similar to TDM_CS_CONN_REQ (port_set_2=dtPack2.channel6, call_reference_1=2346, sink[0]port=dtPack2.channel6.raw_out, sink[0]timeslot=TS1).

The connection servers 46 receive Request 3A and 3B respectively and make specific device calls to their respective device drivers 48 (Request 4A and 4B) using the parameters passed to them. The requests take the form of call functions to make the specific ports 'listen' to a specified timeslot. The device drivers 48 send a specific device signals back to the connection servers 46 (Response 4A and 4B) which interpret the signal and send a confirmation response back to the system timeslot manager 44 (Response 3A and 3B). The response takes the form TDM_CS_CONN_CNF ('Success') where 'Success' is a return code indicating that a connection was established. Other return codes may be sent in the response when the connected fail and the return code may indicate a reason why the connection failed.

When the system timeslot manager 44 has received both Responses 3A and 3B indicating that the TDM connection was a success it creates a ts_connection object 54 having a new connection_id (eg (2001) stores within the ts_connection object 54 the token 56 of the custom server 42 that made the initial request and links the object to the two ts_port_set objects 52A,B that form the connection by storing pointers to these objects in the ts_connection object 54. A new connection_id 58 Each of the ts_port_set objects 52A,B are updated to store pointers to the ts_connection object 54 and the other port_set object. The port objects are each updated to store pointers to the connection object and the source port 30B objects (raw_out) are updated to store the timeslot to which they are connected. Then a Response 2 is sent to the Custom server 42 in the form TDM_CL_CONN('Success', connection_id) where 'Success' is a return code indicating that the connection was established and connection_id 58 contains the number of the connection which will be used when the Custom server 42 wishes to disconnect the connection.

4.1 Disconnection Process

Figure 5:
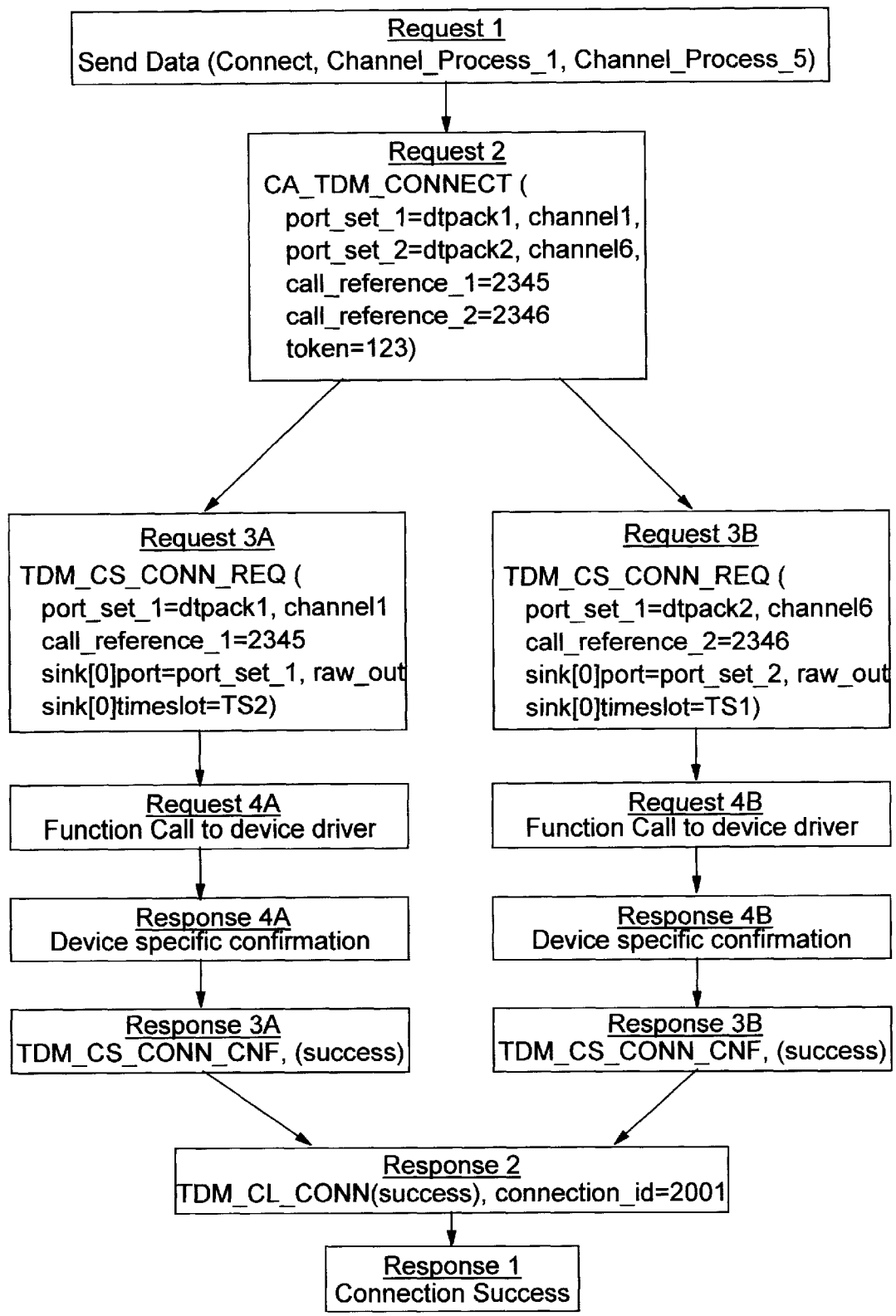
FIG. 5 is a flowchart showing the process steps involved in making a connection.

When either of the calls (2345 or 2346) ends the call (by replacing a handset for example) Channel Processor 1 or Channel Processor 5 recognize the call end and start the disconnection process by requesting the Custom server 42 to break the connect (Request 1 see FIG. 5).

The Custom server 42 looks up the connection_id (eg 2001) corresponding to the requesting Channel Processor 1 or 5) and sends Request 2 to the system timeslot manager 44 in the form of TDM_DISCONNECT_ST(connection_id, token) where the token 56 identifies to the system timeslot manager 44 which Custom server 42 is making the request. Only the Custom server 42 which set up that connection_id 58 will have its disconnection request processed by the system timeslot manager 44.

The system timeslot manager 44 receives Request 2 and checks the connection_id 58 against the token 56 of the Custom server 42 making the request. If the connection was set up by that Custom server 42 then the system timeslot manager 44 proceeds with the disconnection process.

Requests 3A and 3B are built for each connection server 46, by making calls to the connection object the port_sets are established and included in the requests, further the sink ports 30A to be disconnected are established from the connection object and included in the request. Each connection server 46 makes a specific disconnect function call to its respective device driver 48 (Request 4A and 4B) receives a device specific confirmation (Response 4A and 4B) and sends a success response back to the system timeslot manager 44 (Response 3A and 3B) in the form of TDM_CL_DISC_CNF (success). The system timeslot manager 44 sends a response to the custom server (Response 2) in the form of TDM_CL_DISC (success).

4.2 Automatic Breaking of Connections on Caller Hangup

In order for automatic breaking of the connection on caller hang up the connection process described in section 4.0 is altered. After creating the new ts_connection object (54) corresponding to a newly established connection, one or two ts_call_reference objects 60A, 60B are created. Each one corresponds with one of the call_reference parameters passed in request 2 of FIG. 5. Each ts_call_reference object (60A, 60B) contains a connection_id (58) which links it to the ts_connection (54) object (see FIG. 7).

The DTQA device driver (48) is a focal point for information relating to the beginning and ending of telephone calls. This is because it handles all requests to make or hangup calls, and all notifications of new incoming calls or far-end (i.e. caller) hangups. In this invention the DTQA device driver (48) provides a programming interface through which another component can receive notifications each time a call ends.

System timeslot manager receives such notifications from the DTAQ device driver. Each time a call ends, a HUP-NOTIFY message containing the call reference of the call which has just ended, is sent from the DTQA device driver (48) to the system timeslot manager.

Figure 8:
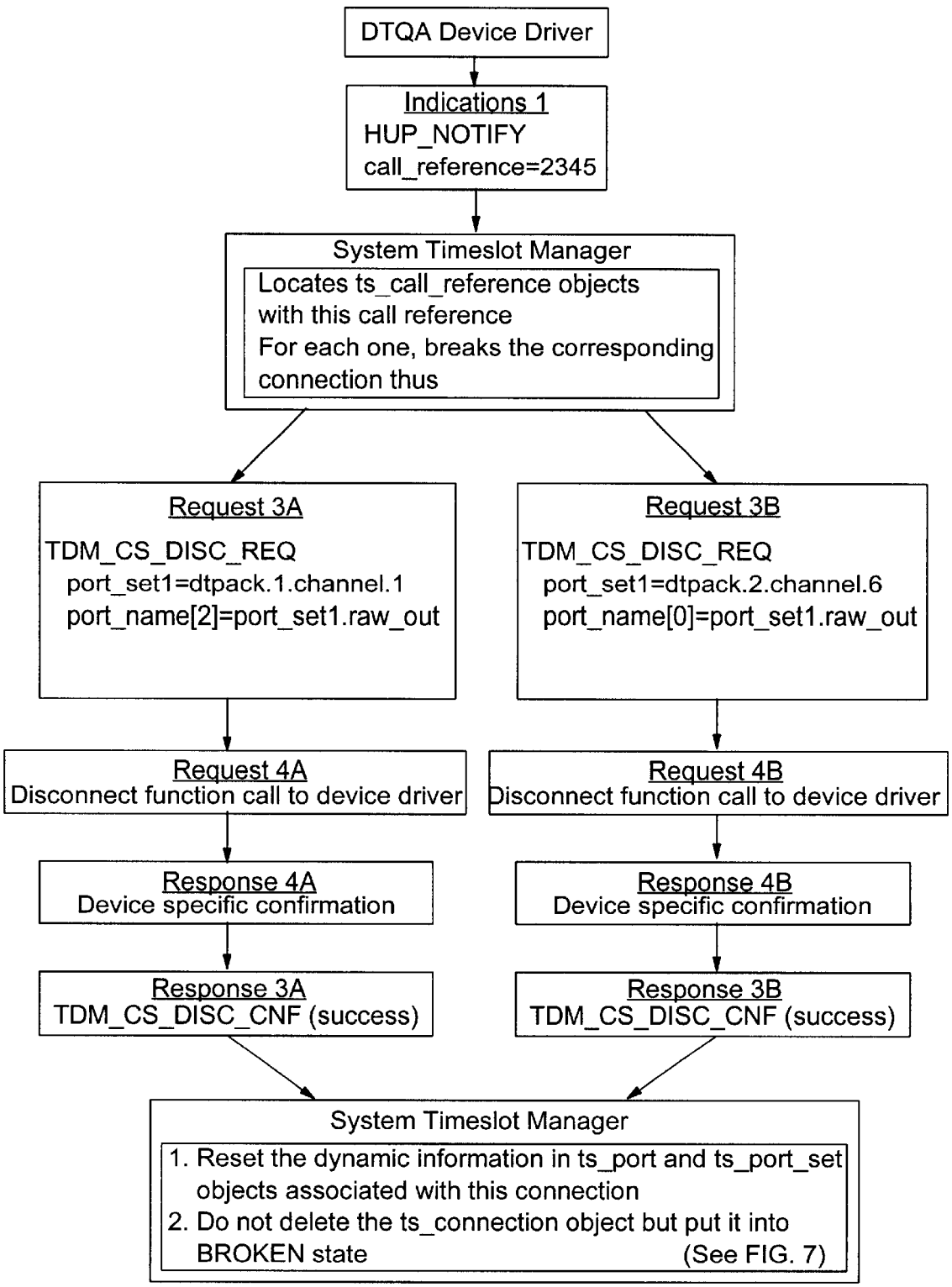
FIG. 8 is a flowchart showing the process steps involved in the automatic teardown of a connection.

The system timeslot manager (44) searches all of the existing ts_call_reference objects (60A, 60B) and locates those which match the call reference in the HUP_NOTIFY message. Each ts_call_reference (60A, 60B) object points to one ts_connection object (54). The connection of the ts_connection object is broken using a modified version (see FIG. 8) of the normal disconnection procedure (see FIG. 6).

As in the normal disconnection procedure, TDM_CS_DISC_REQ requests are sent to the respective connection servers for the port sets involved in the connection. The connection servers execute these requests and send a TDM_CSDISC_CNF response (Response 3A, 3B) back to system timeslot manager as usual. The difference in this case is that system timeslot manager does not then send a TDM_CL_DISC_CNF response to a client, since the disconnection was not requested by a client, but enacted automatically as a result of the caller hanging up.

The system timeslot manager (44) removes from the involved ts_port (50A,B,C,D) and ts_port_set (52A, 52B) objects all states associated with this connection: i.e., in tsport objects (50A,B,C,D) it resets 'connection_id' and (for sink ports only) 'timeslot', and in ts_port_set objects it resets 'connected_ps' and 'connection_id'.

System timeslot manager does not delete the ts_connection object. This is marked as being in 'BROKEN' state (see FIG. 7B), and remains in existence until a client process issues a CA_TDM_Disconnect( ) request for this connection id. The object is then deleted.

4.3 Automatic Set Up of Connections on a TDM Bus.

Automatic set up of connections on the TDM bus extends the basic method for making TDM connections which is described in section 4.0.

The application running on the channel processor (40) receives incoming call and collects call details. The channel processor (40) then requests via the custom server (46) a TDM connection between the channel on which the incoming call was received, and the as-yet-unknown channel on which an outgoing call is about to be placed. This requires an extension to the current interface CA_TDM_Connect( ) to allow port set names to contain a question mark to indicate unknown information, e.g. CA_TDM_Connect (Idtpack.1.channel.1", "dtpack.?.channel.?").

The system timeslot manager (44) recognises that the request cannot yet be executed, and adds it to a list of deferred requests, and associates with it the call-ref parameter, passed by the application, for the yet-to-be determined channel. The application on the channel processor (40) then requests the outbound call to be made by issuing a MakeCall action. The system internally chooses the channel to be used and initiates the outbound call (i.e., dials the number). Each time a channel is selected for an outbound call, an information message is posted within the system. The message contains the selected channel number, and the call reference. The system timeslot manager (44) continually monitors this poll interface for new events. Each time an outbound call is made, timeslot manager receives the informational message, and checks its list of deferred connections to see whether there are any corresponding to the call-ref in the information message. If there are any matches, the system timeslot manager uses the channel number in the information message to fill in the missing information in the deferred TDM connection request, then executes the request. The incoming caller is now connected to the outbound line, and is able to hear ringing or other informational tones.

In this method there is a small modification in the allocation of call references compared with the basic method. In the basic method, call references are allocated to outgoing calls at the time the outgoing call is started. In this method, a call reference is allocated in advance to each channel process as soon as it starts executing a state table. Thus the call reference is available well before an outgoing call is started.

Figure 10:
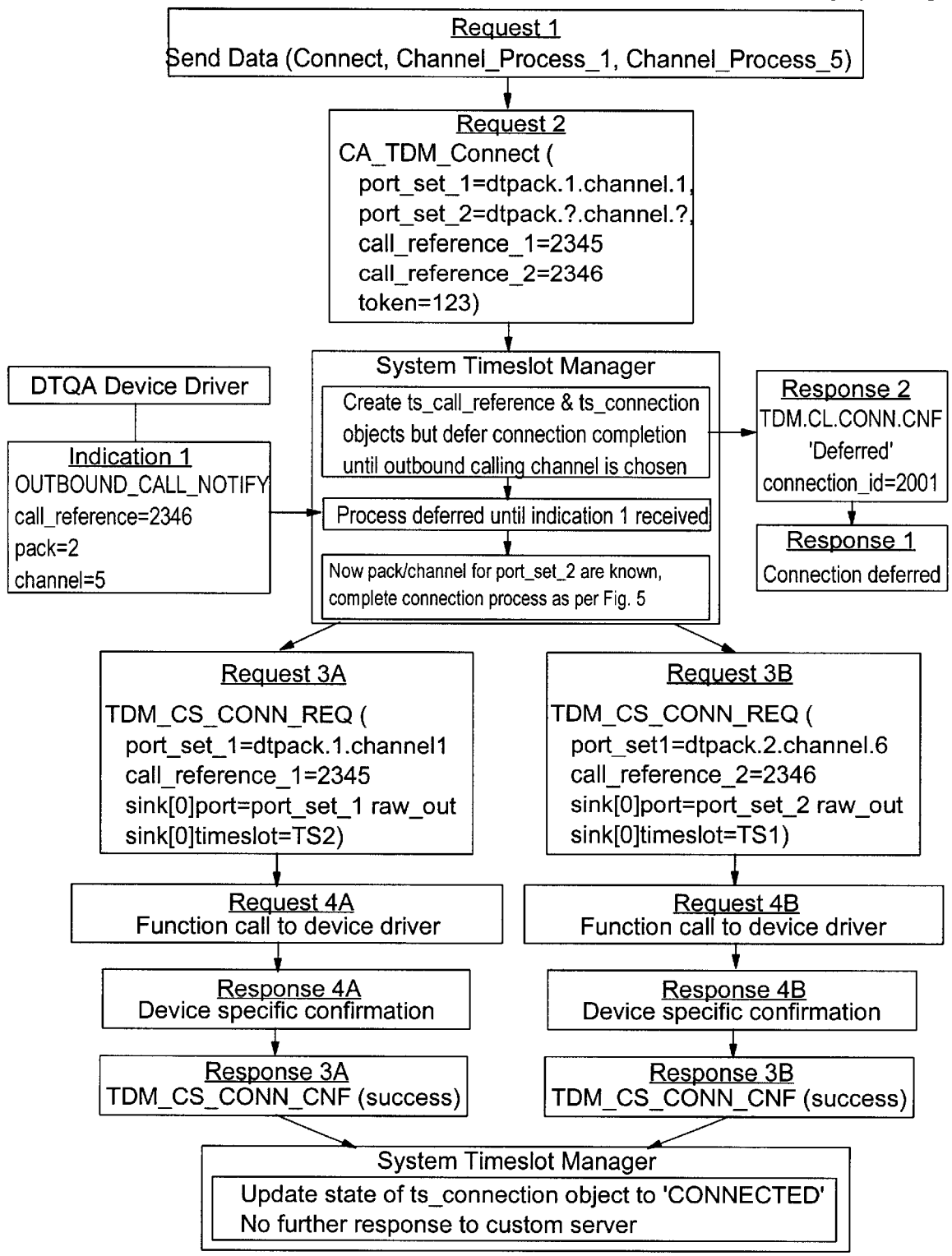
FIG. 10 is a flowchart showing the process steps involved in the automatic teardown of a connection.

The connection process is shown in FIG. 10, in this example, an incoming call (2345) has been received via dtpack.1.1channel.1 and the application wants to make an outbound call to a number entered by the first caller, connecting this outbound call to the incoming call as soon as a channel has been chosen for the outbound call.

The channel process (40) handling the incoming call requests (via custom server 42) a new channel process which will execute the outbound call state table. The new channel process will have a call reference pre-assigned in anticipation of the outgoing call which it may subsequently make.

In this embodiment, it is the outgoing call state table which initiates the TDM connection by issuing Request 1 (FIG. 10) to the custom server (42). The custom server (42) is able to determine the port set name and call reference for the incoming call (dtpack.1.channel.1/2345) and the pre-assigned call reference for the outgoing call (2346). However it cannot discover at this time the port set name for the outgoing call. Instead it uses a port set name of dtpack-.?.channel.? to indicate that the pack and channel number are not yet known. This information is passed to system timeslot manager via the CA_TDM_Connect( ) call Request 2/FIG. 10).

Figure 9:
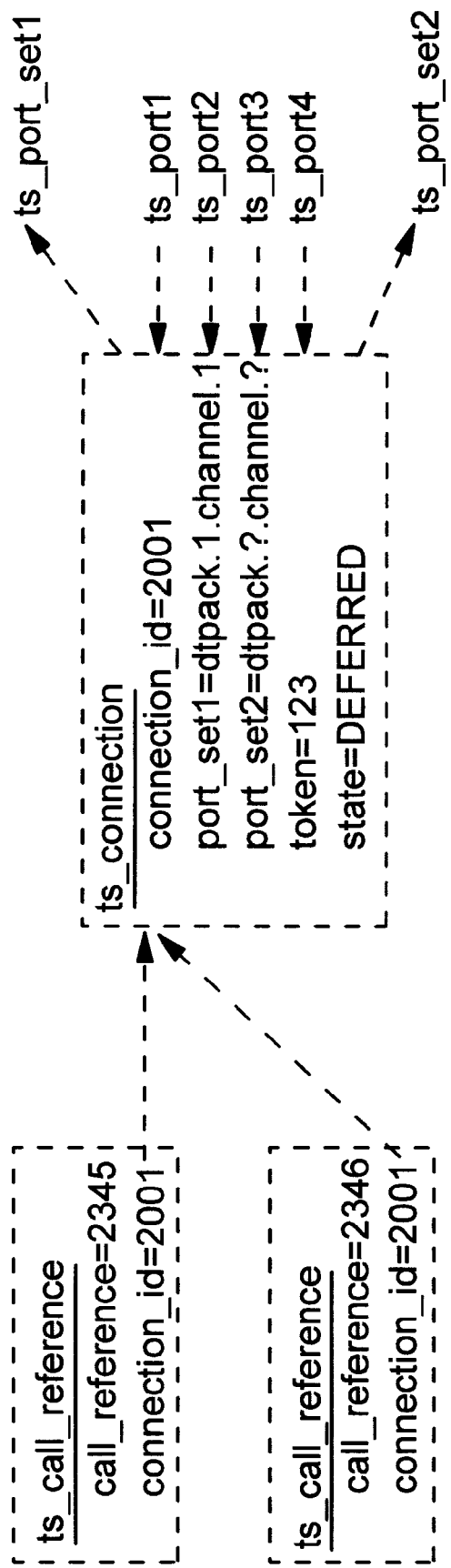
FIG. 9 is a schematic representation of the software objects used in an automatic connection process.

System timeslot manager (44) creates a new ts_connection object, but, recognising that it does not have the complete information to make the connection, does not send requests to the connection servers, and puts the ts_connection object into a 'deferred' state. New ts_call_reference objects are created, with pointers to the new ts_connection object (see FIG. 9).

Response 2 (see FIG. 10) is sent by system timeslot manager (44) to the custom server (42), to notify it of the connection_id for the new connection. A return code in this response will indicate that the connection has not actually been completed, but is 'deferred'. The custom server then generates the similar Response 1 (FIG. 10) to the outgoing state table.

The outgoing state table then proceeds with the MakeCall action to launch an outgoing call on a yet-to-be determined channel.

In this method, the DTQA device driver provides a new facility through which another component can receive notifications each time a new outgoing call is launched.

System timeslot manager registers with the DTQA device driver to receive such notifications. Each time a new outgoing call is launched, an OUTBOUND_CALL_NOTIFY message is sent from the DTQA device driver to the system timeslot manager (Indication 1/Figure 10). The OUTBOUND_CALL_NOTIFY message contains the call reference of the call which has been launched, and the pack and channel number on which the call was placed.

System timeslot manager searches all of the existing ts_call_reference objects and locates those which match the call reference in the OUTBOUND_CALL_NOTIFY message. Each object points to one ts_connection object. Each of these connections is inspected, and if it is a deferred connection, the pack/channel information in the OUTBOUND_CALL_NOTIFY message is used to complete the missing information in the port_set_name within the connection. Now that all the port set names are complete, the deferred connection can immediately be completed by sending requests to the connection servers (Requests 3A and 3B/FIG. 10). The connection proceeds as in the basic method. When Responses 3A and 3B are received by system timeslot manager from the connection servers, the ts_connection object can be put into 'connected' state. A difference from the basic method is that no response is sent to the custom server at this point, since the custom server has already received a response to its request (Request 2/FIG. 10).

5.0 Applications

One example of a connection through a voice processing system 10 and using the TDM is called a trombone. A first caller (eg call 2345) on a connected voice path which enters an Interactive Voice Recognizer (IVR) from a switch on one circuit may request verbally to be connected to another caller. The IVR recognizes the request and the second caller and the second caller (eg call 2346) is dialled and connected to a second voice path on the same switch in a parallel circuit controlled by a second Channel processor (5). The voice processing software may then connect the first voice path to the second by linking the voice paths either directly or through the IVR. Two IVR ports and / or two circuits are consumed, but in some circumstances this may be the only way to make a connection between two callers if the attached switch does not support a call transfer function.

In summary, there is described a bus connection controller in a voice processing is for managing the connection of a timeslot on a time-division multiplex (TDM) bus to a port on an adapter. The voice processing system includes basic time-division multiplex (TDM) connection management to enable the coordination of connections between resources such as channels on line cards (SPacks or VPacks), and channels on digital signal processor (DSPs) cards that provide, amongst other things, voice recognition, text-to-speech, fax capabilities and so on. Problems are encountered when a telephone call in a voice processing system ends suddenly because one of the callers hangs up. If the telephony channel has connections with other channels or resources via a TDM bus, callers may hear spurious data. To address this problem each call is associated with its corresponding connection on the TDM bus and each connection is associated with its connection details including the adapters and ports involved in connecting the calls. When one of the calls ends all the relevant ports involved with the connection are immediately disconnected.

Although the connection has been described in terms of telephone calls, it is apparent that other voice calls, such as a call to a voice recogniser adapter would or to a text to speech adaptor could be used in the same way.

What is clamed is:

1. A voice processing system having a voice application for requesting the closing a bus connection between a first and second voice channel, said voice processing system comprising:
- a bus over which the voice channels are connected;
- a first and second adapter port, each port for connecting a respective channel to the bus;
- means for associating the channels with a connection;
- means for associating the connection with connection details including the adapter ports involved in connecting the channels to the bus and a security token for the connection;
- means for associating each adapter port with a connection and the security token for that connection;
- means for receiving from the first adaptor port (i) an indication that its channel has been disconnected and (ii) the security token associated with the first adaptor port;
- means for determining the connection associated with said first adaptor port and the second adapter port associated with the connection;
- means for comparing the security token from the first adaptor port with the security token from the second adaptor port;
- means for disconnecting the second adaptor port from the bus if the security token match; whereby the voice application does not need to take any further action to disconnect the second port from the bus as such action is initiated in a secure fashion by the first port.

2. A voice processing system according to claim 1 further comprising means for sending a connection close indication to the voice application.

3. A voice processing system according to claim 1 further comprising:
- means for canceling said association of said channels with said connection;
- means for canceling said association of said connection with the connection details; and
- means for associating said connection with a broken state.

4. A voice processing system according to claim 1 wherein said connection is represented by a connection object and wherein said voice processing system further comprises:
- means for receiving a request from said voice application to end the connection; and
- means for, on receipt of the end connection request, for canceling said connection object.

5. A voice processing system according to claim 1 further comprising means for enabling an adapter port to transmit an indication of a channel close.

6. A voice processing system according to claim 1 wherein said channels and connections are represented by objects and said channel objects contain pointers to associated connection objects.

7. A voice processing system as in claim 1 further comprising:
- means for receiving a request from the voice application to disconnect a particular connection when one channel of the particular connection is closed; and
- means for sending the request to disconnect the adapter port after the connection is determined to be the particular connection.

8. In a voice processing system having: a voice application, a bus over which two voice channels are connected; and at least two adapter ports, each port for connecting a channel to the bus; a method for requesting the closing a bus connection between two voice channels, said method comprising:
- associating the channels with a connection;
- associating the connection with connection details including the adapter ports involved in connecting the channels to the bus and a security token for the connection;
- associating each adapter port with a connection and the security token for that connection;
- receiving from a first adaptor port (i) an indication that its channel has been disconnected and (ii) the security code associated with the first adaptor port;
- determining the connection associated with said first adaptor port and the second adapter port associated with the connection;
- comparing the security token from the first adaptor port with the security token from a second adaptor port;
- disconnecting the second adaptor port from the bus if the security tokens match; whereby the voice application does not need to take any further action to disconnect the second port from the bus as such action is initiated in a secure fashion by the first port.

9. A method according to claim 8 further comprising sending a connection open or close indication to the voice application.

10. A method according to claim 8 further comprising:
- canceling said association of said channels with said connection;
- canceling said association of said connection with the connection details; and
- associating said connection with a broken state.

11. A method according to claim 8 wherein said connection is represented by a connection object and wherein said method further comprises:
- receiving a request from said voice application to end the connection; and
- on receipt of the end connection request, canceling said connection object.

12. A method according to claim 8 further comprising enabling an adapter port to transmit an indication of a channel open or close.

13. A method according to claim 8 wherein said channels and connections are represented by objects and said channel objects contain pointers to associated connection objects.

14. A method according to claim 8 further comprising:
- receiving a request from the voice application to disconnect or connect a particular connection when one channel of the particular connection is closed or opened; and sending the request to connect or disconnect the adapter port after the connection is determined to be the particular connection.

15. In a voice processing system having a bus over which voice channels are connected; more than one adapter port, each port for connecting a voice channel to the bus; a voice application for requesting the opening or closing a bus connection between two voice channels, a bus connection controller comprising:

means for associating the channels with a connection;

means for associating the connection with connection details including the adapter ports involved in connecting the channels to the bus and a security token for the connection;

means for associating each adapter port with a connection and the security token for that connection;

means for receiving from the first adaptor port (i) an indication that its channel has been disconnected and (ii) the security token associated with the first adaptor port;

means for determining the connection associated with said first adaptor port and the second adapter port associated with the connection;

means for comparing the security token from the first adaptor port with the security code from the second adaptor port;

means for disconnecting the second adaptor port from the bus if the security tokens match; whereby the voice application does not need to take any further action to disconnect the second port from the bus as such action is initiated in a secure fashion by the first port.

16. In a system according to claim 15, the bus connection controller further comprising means for sending a connection open or close indication to the voice application.

17. In a system according to claim 15, the bus connection controller further comprising:

means for canceling said association of said channels with said connection;

means for canceling said association of said connection with the connection details; and means for associating said connection with a broken state.

18. In a system according to claim 15, the bus connection controller wherein said connection is represented by a connection object and wherein said bus connection controller further comprises:

means for receiving a request from said voice application to end the connection; and means for, on receipt of the end connection request, for canceling said connection object.

19. In a system according to claim 15, the bus connection controller further comprising means for enabling an adapter port to transmit an indication of a channel open or close.

20. In a system according to claim 15, the bus connection controller wherein said channels and connections are represented by objects and said channel objects contain pointers to associated connection objects.

21. In a system according to claim 15, the bus connection controller further comprising:

means for receiving a request from the voice application to disconnect or connect a particular connection when one channel of the particular connection is closed or opened; and means for sending the request to connect or disconnect the adapter port after the connection is determined to be the particular connection.

* * * * *